March 5, 1968  I. F. LARSSON  3,371,954
CAMPING TRAILER

Filed Jan. 12, 1966  2 Sheets-Sheet 1

INVENTOR.
I. F. LARSSON

March 5, 1968   I. F. LARSSON   3,371,954
CAMPING TRAILER

Filed Jan. 12, 1966   2 Sheets-Sheet 2

INVENTOR.
*I. F. LARSSON*

3,371,954
CAMPING TRAILER
Ivar F. Larsson, 198 Long Hill Road,
Oakland, N.J. 07436
Filed Jan. 12, 1966, Ser. No. 520,271
4 Claims. (Cl. 296—23)

ABSTRACT OF THE DISCLOSURE

The disclosure is of a camping trailer which includes the usual body including a floor, front and rear walls, and two side walls. A folding bed assembly, comprising first and second beds, is built into a hinged panel in each side wall in such a way that the beds are completely inside the trailer when they are closed, and they open sideways when they are to be used. In each bed assembly, the first bed is built on the hinged panel in each side wall of the trailer as a base and has a mattress floor spaced from the side wall panel to provide a first storage space therebetween. The second bed is hinged to the first and includes a mattress floor which is spaced from the mattress floor of the first bed when the bed assembly is closed, to provide a second storage space therebetween.

---

This invention relates to camping trailers and, particularly, to collapsible camping trailers.

Trailers of the type embodied by the present invention include a box-like frame which carries beds supported in such a way that they can be folded up or otherwise concealed for traveling and then opened up for use. The trailer also includes a relatively large piece of canvas which folds up for traveling and can be raised and held in place for camping. The primary problem with these known trailers lies in the beds which are so arranged that there is no convenient storage space for bedding, stoves, and other equipment, and, in addition, the beds are clumsy and awkward to manipulate. Generally, in these trailers, storage articles must be removed from the stored beds and placed on the ground before the beds can be opened. Similarly, the storage articles must be placed on the ground or in some other inconvenient place before the beds can be stored for traveling.

Accordingly, the objects of the invention concern the provision of an improved collapsible camping trailer.

Briefly, a collapsible trailer embodying the invention includes the usual two-wheel axle and open-box chassis which is supported on the axle and includes two side walls. The trailer includes two double-bed assemblies which themselves include storage space and are so mounted in the side walls that the interior of the chassis is available for storage. The trailer also includes a canvas roof supported on a collapsible frame.

The invention is described in greater detail by reference to the drawing wherein.

Figure 1:
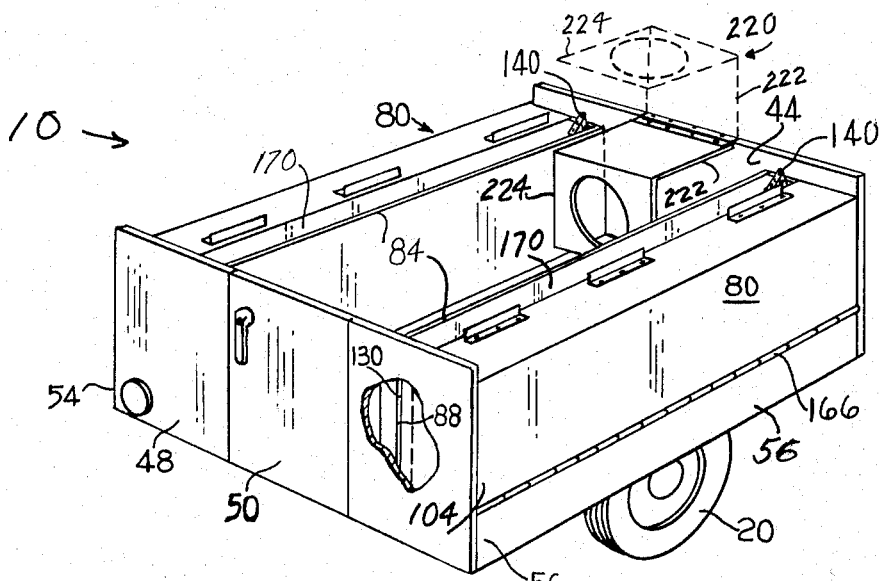
FIG. 1 is a perspective view of a trailer embodying the invention with the canvas top omitted.

A camping trailer 10 which embodies the principles of the invention includes the usual wheels 20 and axle 26 on which is supported a frame 30 in any suitable manner, the support arrangement not being described in detail. The frame 30 includes a floor 40, a front wall 44 which rises vertically therefrom, a rear wall 48 which rises vertically therefrom and includes a door 50, and two side walls 54 and 56. The floor 40 preferably comprises a metal base 62 covered by a layer of plywood 66 and finally a carpet 70 or other protective or decorative covering such as floor tile. The wheels which project through the floor 40 are covered by protective enclosures 74.

Figure 2:
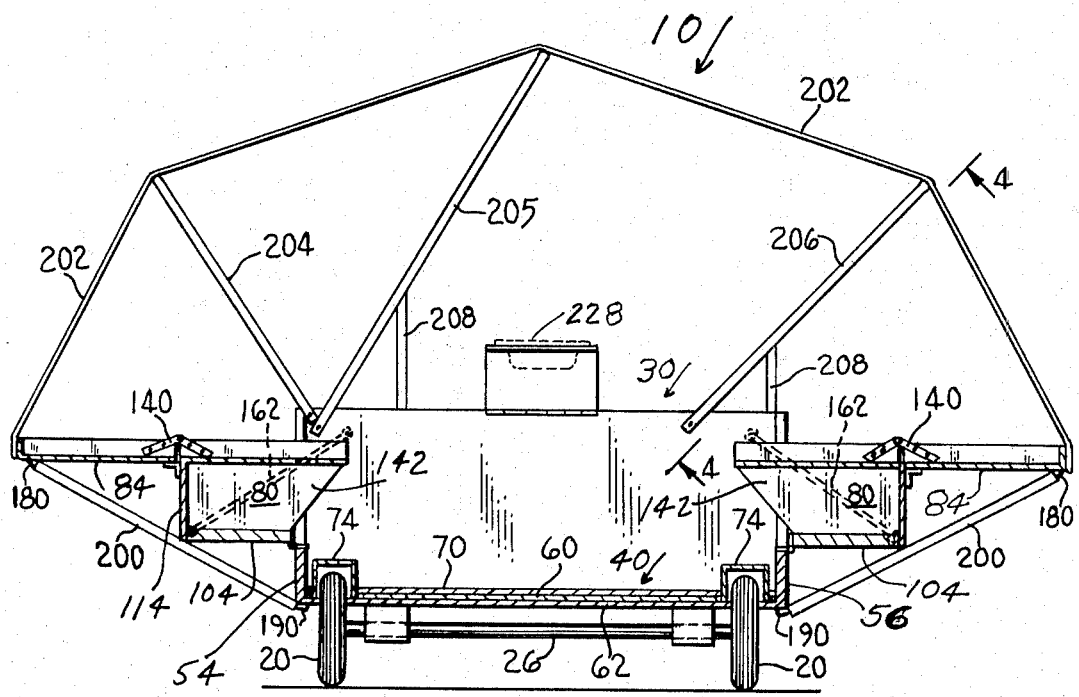
FIG. 2 is an end elevational view, partly in section, of the trailer of FIG. 1 with the canvas top and its support means shown.
Figure 3:
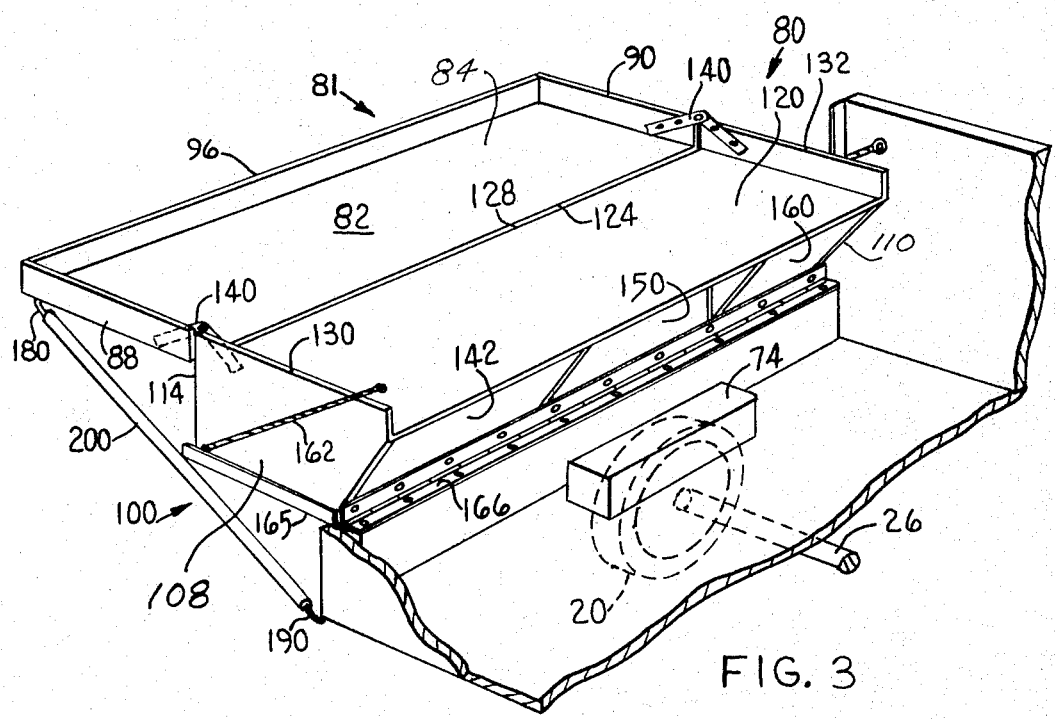
FIG. 3 is a perspective view of a portion of the trailer of the invention showing details of a bed assembly.
Figure 4:
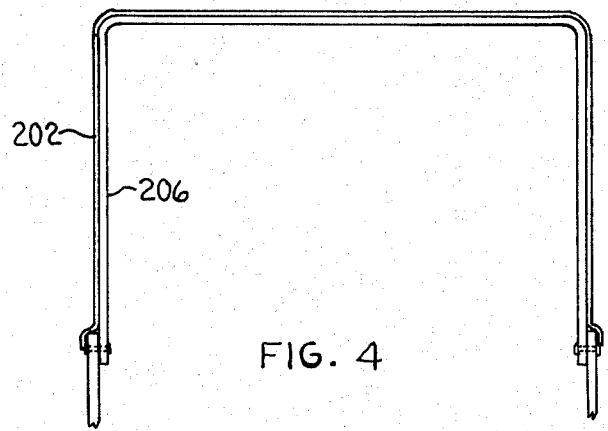
FIG. 4 is a sectional view along the lines 4—4 in FIG. 2 showing a support member for the canvas top.

The trailer 10 includes two double-bed assemblies 80 which are identical and, accordingly, only one will be described and shown in detail. The double-bed assembly 80 is shown closed in FIG. 1 and open and ready for use in FIGS. 2 and 3. The bed assembly 80 includes a first bed 81 which comprises a first tray-like support member 82 including a base 84, end walls 88 and 90, and an outside side wall 96 which lies remote from the trailer frame 30 when the beds are open. The base 84 comprises a support for a sleeping mattress (not shown). The bed assembly 80 includes a second bed 100 which comprises a base 104 (FIG. 2), end walls 108, 110, and an outer side wall 114, and a mattress support floor 120 which is supported on the walls 108, 110, 114 spaced above the base 104. The mattress support floor 120 of the second bed 100 lies in the same plane as the mattress support floor 84 of the first bed 81. In addition, the two floors 84 and 120 have aligned edges 124, 128, respectively, which are hinged together. A pair of end walls 130 and 132 rise from the mattress floor 120 as extensions of walls 108 and 110, respectively, with walls 130 and 88 aligned and walls 132 and 90 aligned. A pair of foldable brackets 140 are secured between these upstanding walls 88, 130, and 90, 132 of the mattress support floors. The walls 114 carry on their outer surfaces brackets 141 which help support floors 84 of beds 81.

The space 142 between the base 104 and mattress floor 120 is used for storage, and this space is accessible from inside the trailer when the bed assembly 80 is open. The inner edges of the base 104 and floor 120 are suitably cut out to provide an inset 150 which fits over the tire 20 and its cover 74 when the beds are folded up and stored as in FIG. 1. The inner edges of the base 104 and floor 120 which define the entrance to the storage space 142 may carry sliding doors or doors 160 hinged at top or bottom or sides or the like to conceal the storage space.

A flexible support cable 162 is secured between the outer surface of each end wall 108, 110 and the trailer frame 30. These cables are taut and help support the bed assembly 80 when the beds are open, as in FIG. 2.

The bed assembly 80 is secured to the trailer by means of a hinge 166 secured to the base 104 of bed 100, and to the top edge of side wall 54 of the trailer frame. Preferably, the outer wall of the base 104 of the bed 100 between hinge 166 and outer wall 114 is treated to have the same appearance or to have an appearance which blends esthetically with that of the outer surface of side wall 54 of the frame. Of course, all outer surfaces are designed to blend with each other.

The outer surface of the base 84 of the bed 81 carries at least two spaced-apart posts or pins 180 aligned with similar hooks 190 secured to the lower surface of the base of the frame 30. Rigid tubes or rods 200 placed between pairs of aligned pins and hooks 180, 190 support the bed assemblies 80 when they are open. The tubes or posts 200 may be hingedly secured to the hooks 190 or to the under surface of the base of the frame of the trailer, and they may be storable beneath the frame by means of suitable clamps (not shown) when the beds are stored and the tubes are not in use.

When the beds are folded and stored, as shown in FIG. 1, the bed 81 is positioned side by side with the bed 100, with wall 88 abutting wall 130 and wall 90 abutting wall 132. Thus, a vertical storage space 170 is provided between mattress floor 84 and mattress floor 120, with wall 96 blocking the bottom of this storage space. Portion 164 of base 104 lies inside and adjacent to the inner surface of the side wall 54 of the frame of the trailer, and the portion 165 of the outer surface of this base 104 rises vertically above the hinge 166 in the same plane as and, in effect, as a coplanar extension of the side wall of the frame of the trailer.

The space between bed assemblies 80 when folded up, as seen in FIG. 1, provides a convenient storage space for stoves and other camping equipment. In addition, the inner surface of front wall 44 of the trailer frame 30 between the bed assemblies can be used to mount equipment such as a collapsible sink 220. In one desirable construction, the sink assembly comprises an L-shaped bracket which includes a first plate 222 which is hingedly secured to wall 44 and a second plate 224 which is at right angles to the first and in which the sink 220 (FIG. 2) is mounted. When the sink is collapsed, it appears as shown in FIG. 1, with plate 222 horizontal and plate 224 oriented vertically downwardly with the sink facing toward the rear of the trailer. When the sink is raised into position for use, it is pivoted upwardly to take the position shown in dash lines (FIG. 1) and held in place in any suitable fashion, such as by removable legs or a spring hinge or the like.

The trailer also includes a canvas cover 202 which is in the nature of a tent and a support arrangement therefor. This arrangement includes three U-shaped rods 204, 205, 206, each of which has two legs and a connecting portion. The rods 204 and 205 are hinged at common points on end walls 44 and 48 near one side of the trailer frame, and rod 206 is hinged to end walls 44 and 48 near the opposite side of the trailer frame. The rods 205 and 206 are supported by auxiliary hinged rods 208 which engage suitable apertures in the top of the front and rear walls 44 and 48 of the frame when the rods 204, 205, 206 are open and support the canvas roof 202. The edges of the canvas 202 engage the outer edges of the beds 81 of the bed assemblies 80. The usual ties are provided for securing the canvas 202 to the rods 204, 205, 206, and auxiliary tapes are provided between rods 204 and 205 and between rods 205 and 206.

When the roof 202 is collapsed, the rods 204, 205, 206 fold down and rest on the top of the trailer frame 30, and the canvas roof is folded as neatly as possible over the rods and top of the trailer frame. The usual trailer cover is placed over the roof, the collapsed rods and folded beds, and any other stored articles between the bed assemblies 80.

The trailer of the invention has many advantages, the most important of which is that storage space is provided between the bed assemblies and within the structure of the bed assemblies themselves. Another important advantage is that the beds can be opened from outside the trailer without removing articles stored between the folded-up beds, and the beds can be opened without disturbing the open tent mechanism. Another advantage of the bed structure is that the bed assembly is so designed that it can be opened and closed quite easily by a woman or even a relatively small child. It is to be noted that the weight of the part of the bed which is inside the hinge pivot point aids the closing operation. Another advantage of the bed assembly is that apparatus such as the sink described can be designed to open up to be at a convenient height for adult use. Other trailers only have sufficient space to accommodate an uncomfortably low sink.

What is claimed is:

1. A collapsible sleeping trailer comprising
a main frame including a base, front and rear walls, and first and second side walls extending vertically upwardly from said base, and
first and second foldable bed assemblies hingedly secured to said first and second side walls, respectively, each bed assembly in its folded condition lying inside said frame and including a portion which comprises an extension of the side wall to which it is secured,
each bed assembly including first and second beds, said first bed containing within itself a first storage area, a second storage area being provided between the first and second beds when they are closed and face each other,
said first bed having a base and a first mattress support floor spaced therefrom to form said first storage area,
said second bed including a second mattress support floor which, when said bed assembly is closed, is spaced from and is parallel to said first mattress support floor of said first bed to provide said second storage area between said first and second mattress support floors,
said second mattress support floors of said bed assemblies being parallel to and facing each other when said bed assemblies are closed,
said bed assemblies when closed having a space between them which provides auxiliary storage room.

2. The trailer defined in claim 1 and including a sink assembly secured to said floor wall of said frame and positioned between said bed assemblies.

3. The trailer defined in claim 1 and including a collapsible canvas roof assembly including support braces pivotally secured to said frame and a canvas roof resting on said support braces.

4. The trailer defined in claim 1 wherein
each side wall of said frame includes a hinged panel and each bed assembly is constructed on a hinged panel as a base,
in each bed assembly said first bed being built on the hinged panel in the side wall of the trailer as a base and having said first mattress support floor spaced therefrom with said first storage area being provided therebetween, said first mattress support floor having first side walls rising therefrom,
in each bed assembly each hinged panel being normally vertical when its bed assembly is closed but being adapted to be rotated laterally outwardly to a position in which said panel and said first mattress support floor lie horizontally and said storage space between them is accessible from inside said trailer,
in each bed assembly, said second mattress support floor of said second bed including second side walls rising therefrom,
the second side walls of said second bed being hingedly secured to said first side walls of said first bed whereby said beds can be rotated with respect to each other so that they overlie each other when they are closed and they are side by side when they are open,
said bed assembly when closed having said first and second beds oriented vertically parallel to each other inwardly of the trailer body with said first mattress support floor spaced from said second mattress support floor by said first and second side walls to provide a storage space therebetween.

References Cited

UNITED STATES PATENTS

| 2,481,230 | 9/1949 | MacDonald | 296—23.1 |
| 2,640,721 | 6/1953 | Kors | 296—23.2 |
| 1,864,047 | 6/1932 | Lawhorne | 296—23.6 |

FOREIGN PATENTS

| 831,221 | 5/1938 | France. |

LEO FRIAGLIA, *Primary Examiner.*

PHILIP GOODMAN, BENJAMIN HERSH, *Examiners.*